United States Patent
Huang et al.

(10) Patent No.: US 11,734,613 B2
(45) Date of Patent: Aug. 22, 2023

(54) MACHINE-LEARNED DATABASE RECOMMENDATION MODEL

(71) Applicant: ZenPayroll, Inc., San Francisco, CA (US)

(72) Inventors: Victoria Huang, Denver, CO (US); Alyssa Hester, Lakewood, CO (US); Rebecca Carter, San Francisco, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

(21) Appl. No.: 17/887,513

(22) Filed: Aug. 15, 2022

(65) Prior Publication Data

US 2022/0391770 A1    Dec. 8, 2022

Related U.S. Application Data

(63) Continuation of application No. 17/012,054, filed on Sep. 4, 2020, now Pat. No. 11,449,804.

(51) Int. Cl.
*G06N 20/00*   (2019.01)
*G06F 16/248*  (2019.01)

(52) U.S. Cl.
CPC .......... *G06N 20/00* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 10,235,668 B1 | 3/2019 | Ellis et al. | |
| 10,728,310 B1* | 7/2020 | Brown | G06Q 30/0251 |
| 10,861,006 B1* | 12/2020 | Ilincic | G06Q 20/341 |
| 11,244,340 B1* | 2/2022 | Morin | G06K 9/6256 |
| 2011/0029564 A1 | 2/2011 | Graham et al. | |
| 2013/0103464 A1* | 4/2013 | Kuznetsov | G06Q 20/0855 707/769 |
| 2013/0151388 A1 | 6/2013 | Falkenborg et al. | |
| 2014/0067909 A1* | 3/2014 | Johansson | G06Q 30/02 709/203 |
| 2015/0081560 A1* | 3/2015 | Grossman | G06Q 20/405 705/44 |
| 2017/0345108 A1* | 11/2017 | Bakshiram | G06Q 20/389 |
| 2019/0325532 A1 | 10/2019 | Torrenegra et al. | |
| 2020/0302552 A1* | 9/2020 | Rephlo | G06Q 40/12 |

* cited by examiner

*Primary Examiner* — Toan H Vu
(74) *Attorney, Agent, or Firm* — Fenwick & West LLP

(57) ABSTRACT

A central database system trains a machine-learned model based on training data identifying characteristics of account holder entities, characteristics of account provider entities, and relationships between the account holder entities and account provider entities. For a target entity, the central database system then identifies a target set of account provider entities, and applies the trained machine-learned model to identify a subset of the target set of account provider entities. The identified subset of account provider entities are entities that, if recommended to the target entity, are most likely to result in an established relationship with the target entity. A recommendation is then generated for display to the target entity, the recommendation identifying the subset of account provider entities and including interface elements that, if selected by the target entity, cause a notification identifying the target entity to be sent to a corresponding account provider entity.

20 Claims, 4 Drawing Sheets

400

Accessing training set of information describing characteristics of account holder entities, account provider entities, and associated relationships
410

Training a machine-learned model using the accessed training set of information to identify account provider entities to recommend
420

Identifying a target entity associated with a central database system
430

Identifying a target set of account provider entities based on characteristics of the identified target entity
440

Apply machine-learned model to characteristics of target entity and the target set of account provider entities to identify a subset of account provider entities
450

Notifying the target entity of the identified subset of account provider entities within a recommendation interface
460

FIG. 4

MACHINE-LEARNED DATABASE RECOMMENDATION MODEL

CROSS REFERENCE TO RELATED APPLICATIONS

This application is a continuation of U.S. application Ser. No. 17/012,054, filed Sep. 4, 2020, now U.S. Pat. No. 11,449,804, which is incorporated by reference in its entirety.

This disclosure relates generally to database systems, and more specifically to training and applying machine-learned models in a database system.

BACKGROUND

Centralized database systems, such as employment management database systems, store large amount of data for the various entities associated with the database systems. In some embodiments, this data includes relationships between the entities associated with the database system. Accordingly, centralized database systems may be able to identify patterns and characteristics of the related entities, and thus may be positioned to offer valuable insight into the conditions associated with the establishment of such relationships.

BRIEF DESCRIPTION OF THE DRAWINGS

FIG. 4 is a flowchart illustrating a process for training and applying a machine-learned model to recommend account provider entities to a target entity, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
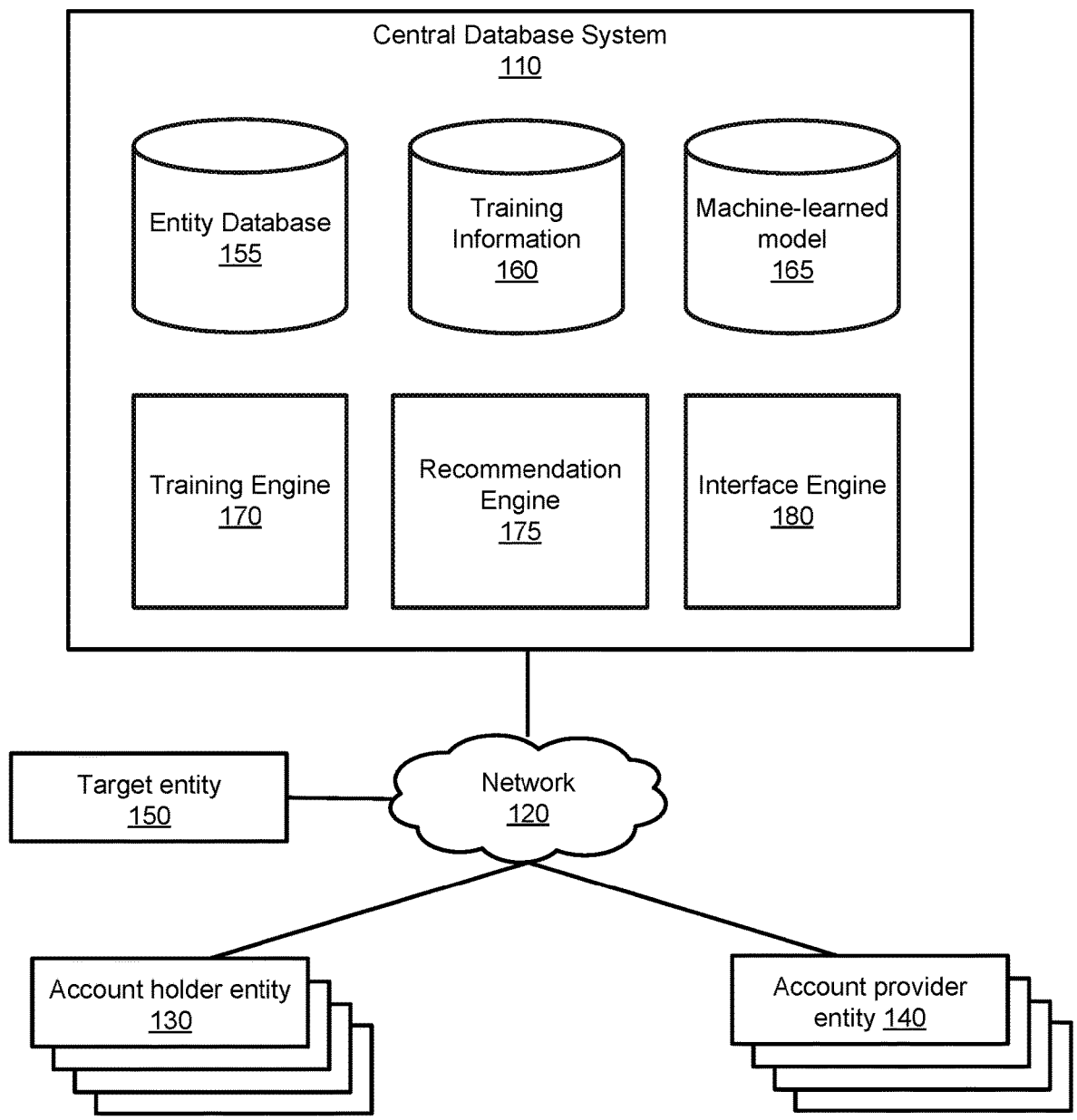
FIG. 1 is a block diagram of a system environment in which a central database system operates, according to one embodiment.

FIG. 1 is a block diagram of a system environment in which a central database system operates, in accordance with an embodiment. The system environment 100 shown by FIG. 1 includes a central enrollment database system 110, a network 120, one or more account holder entities 130, one or more account provided entities 140, and a target entity 150. The system environment 100 may have alternative configurations than shown in FIG. 1, including for example different, fewer, or additional components.

The account holder entities 130, the account provider entities 140, and the target entity 150 communicate with each other and with the central database system 110 via one or more computing devices capable of receiving user input as well as transmitting and/or receiving data via the network 120. Examples of computing devices include conventional computer systems (such as a desktop or a laptop computer, a server, a cloud computing device, and the like), client devices (such as smartphones, tablet computers, mobile devices, and the like), or any other device having computer functionality. The devices of the account holder entities 130, the account provider entities 140, and the target entity 150 are configured to communicate with the central database system 110 via the network 120, for example using a native application executed by the devices or through an application programming interface (API) running on a native operating system of the devices, such as IOS® or ANDROID™. In another example, the devices of the account holder entities 130, the account provider entities 140, and the target entity 150 are configured to communicate with the central database system 110 via an API running on the central database system.

It should be noted that when reference is made to an account holder entity 130, an account provider entity 140, or the target entity 150 performing an action within the environment 100 of FIG. 1, in practice it may be a device of the account holder entity, the account provider entity, or the target entity (respectively) that is performing the action, for instance at the direction of the account holder entity, the account provider entity, or the target entity.

Account holder entities 130 can include any entities associated with accounts of the central database system 110. For instance, an account holder entity 130 may be an individual, an employee, an employer, a representative of a company or organization, and the like. As one example, an employer of 100 employees may be associated with an employer account within the central database system 110, and may provide employee information (such as name, tile, biographic information, geographic information, salary, benefits, and the like) for each employee to the central database system 110. The central database system 110, in turn, may provision an account through the central database system for each employee, and thus each employee may also be an account holder entity 130.

Account provider entities 140 can include any entity that enables the creation of a user account outside of the context of the central database system 110. For instance, an account provider entity 140 may be a lawyer or law firm, an accountant or accounting firm, a component or materials supplier, an advisor, a venture capital firm or banking organization, a technology partner (such as an integration or IT provider), or any other suitable service or product provider. In some embodiments, each account provider entity is associated with an account of the central database system 110. As used herein, "the creation of a user account outside of the context of the central database system 110" can refer to the creation of a digital account through an online portal or computer system associated with an account provider entity 140, can refer to a non-digital account with an account provider entity (such as an attorney-client engagement, a brokerage account, a business relationship, an execution of a contract or other agreement, and the like), and can refer to the establishment of any relationship or association between an account provider entity and another entity.

The target entity 150 is an account holder entity for which a recommendation of one or more account provider entities 140 is being made. For example, the target entity 150 can be an organization, company, individual, or the like. The central database system 110 can select the target entity 150 (as described below), or the target entity can be identified to the central database system, for instance in response to a request from an individual associated with the target entity 150.

The central database system 110, the account holder entities 130, and the account provider entities 140 are configured to communicate via the network 120, which may comprise any combination of local area and/or wide area networks, using wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The central database system 110 is configured to receive and store various information associated with one or more entities, such as the account holder entities 130 and the account provider entities 140. As described below, the central database system 110 is able to train and apply a machine-learned model to identify a subset of account provider entities from the set of account provider entities 140 that, if recommended to an account holder entity 130 ("target entity" hereinafter), are most likely to result in the creation or establishment of account with the target entity. The central database system 110 is able to leverage information stored by the central database system associated with the account holder entities 130 and the account provider entities in order to train the machine-learned model, beneficially enabling the central database system to generate recommendations that are more relevant to a target entity than the account holder entities 130 or the account provider entities 140 are individually able to generate.

In the embodiment of FIG. 1, the central database system 110 includes an entity database 155, a training information database 160, a machine-learned model 165, a training engine 170, a recommendation engine 175, and an interface engine. It should be noted that in other embodiments, the central database system 110 can include fewer, additional, or different components that those illustrated herein. In addition, in the embodiment of FIG. 1, the central database system 110 is associated with an entity (such as a company or organization) different from the account holder entities 130 and the account provider entities 140. Accordingly, the central database system 110 includes hardware (such as servers, networking equipment, databases or other storage devices, data center systems, and the like) distinct (and in some embodiments, physically remotely from) the devices associated with the account holder entities 130 and the account provider entities 140.

The entity database 155 is configured to store information associated with the account holder entities 130 and the account provider entities 140. In some embodiments, the information stored in the entity database 155 is information gathered from the account holder entities 130 and/or the account provider entities 140 as these entities are establishing accounts with the central database system 110. For instance, the central database system 110 can be an enterprise software provider that provides human resources software to employers for use with employees. In this example, the employer may provide information describing characteristics of the employer and information describing characteristics of each of the employees to the central database system 110 during the course of provisioning accounts for the employees with the central database system. Likewise, account provider entities 140, such as manufacturers, law firms, accounting firms, and the like can provide information describing the account provider entities, employees of the account provider entities, and customers of the account provider entities to the central database system 110 during the course of provisioning accounts for the employees and customers with the central database system. In other embodiments, information associated with the account holder entities 130 and account provider entities 140 can be provided to the central database system 110 for storage in the entity database 155 via any other suitable source or medium.

Examples of information associated an account holder entity 130 stored by the entity database 155 can include but are not limited to: a type of the account holder entity (e.g., a company, an educational institution, a professional or charitable association, an employer, an employee, a government organization, and the like), an age of the account holder entity (e.g., how long the entity has been in business, been established, etc.), a number of individuals or headcount associated with the account holder entity, an industry or focus associated with the account holder entity, a filing city or state associated with the account holder entity (e.g., where the account holder entity files taxes), a tax status of the account holder entity (e.g., for-profit business, non-profit organization, etc.), a state of incorporation or registration of the account holder entity, cities or states in which the account holder entity is present (e.g., does business, has offices, etc.), cities or states in which the account holder entity has employees or members, addresses associated with the account holder entity (e.g., addresses of offices of the account holder entity), software used by the account holder entity, revenue or profits of the account holder entity, geographic locations of customers of the account holder entity, account provider entities associated with the account holder entity, or any other suitable characteristic of the account holder entity.

Examples of information associated an account provider entity 140 stored by the entity database 155 can include but are not limited to: a type of the account provider entity (e.g., a company, a law firm, an account firm, an educational institution, a supplier, a manufacturer, a distributor, a venture capital organization, a banking or other financial institution, a technology provider or partner, and the like), an age of the account provider entity (e.g., how long the entity has been in business, been established, etc.), a number of individuals or headcount associated with the account provider entity, an average number of individuals or headcount associated with account holder entities associated with the account provider entity, an industry or focus associated with the account provider entity, an industry or focus associated with account holder entities associated with the account provider entity, a filing city or state associated with the account provider entity and associated with any account holder entities associated with the account provider entity, addresses associated with the account provider entity (e.g., addresses of offices of the account provider entity), a tax status of any account holder entities associated with the account provider entity, a state of incorporation or registration of the account provider entity or with any account holder entities associated with the account provider entity, cities or states in which the account provider entity is present or has offices, a geographic disbursement of account holder entities associated with the account provider entity, software used by the account provider entity, revenue or profits of account holder entities associated with the account provider entity, an identity or any other characteristics of account holder entities associated with the account provider entity, tax or finance issue expertise of the account provider entity, compliance expertise of the account provider entity, an industry expertise of the account provider entity, fundraising or selling expertise of the account provider entity, non-profit expertise and capabilities of the account provider entity (e.g., grant expertise, R&D expertise, and the like), services offered by the account provider entity, a service type associated with the account provider entity (e.g., an automated service, personal/hand-holding service, and the like), a current number of account holder entities associated with the account provider entity, a new client status of the account provider entity (whether the account provider entity is looking for new clients, how new clients the account provider entity is willing to accept, etc.), or any other suitable characteristic of the account holder entity.

The training information database 160 includes a set of training information used to train a machine-learned model. In some embodiments, the set of training information includes historical information stored by the entity database 155 associated with a set of account holder entities 130 and a set of account provider entities 140, and historical information representative of relationships between the two sets of entities. For instance, the set of training information can include multiple entries, with each entry including information describing characteristics of an account holder entity 130, information describing characteristics of an account provider entity 140 with which the account holder entity has established an account, and information describing the relationship between the account provider entity and the account holder entity (such as a type of the account, when the account was established, the like).

The machine-learned model 165 is a model that is trained by the training engine 170 using the set of training information stored in the training information database 160. The training engine 170 can train the machine-learned model 165 initially based on the set of training information, and can retrain the machine-learned model when the set of training information is updated (e.g., new information is added, one or more characteristics of an account holder entity 130 or an account provider entity has changed, and the like). The machine-learned model 165 can be retrained by the training engine 170 periodically, after the passage of a threshold amount of time, after the occurrence of a triggering event, at the request of a user or other entity associated with the central database system 110, and the like.

The training engine 170 can implement one or more machine learning techniques to train the machine-learned model 165. For instance, the machine-learned model can include one or more models, including but not limited to a linear support vector machine (linear SVM), boosting for other algorithms (e.g., AdaBoost), neural networks, logistic regression, naïve Bayes classifiers, memory-based learning techniques, random forest classifiers, bagged trees, decision trees, boosted trees, boosted stumps, a supervised or unsupervised learning algorithm, or any suitable combination thereof.

The machine-learned model 165 is trained based on the set of training information in order to identify one or more account provider entities 140 that, if recommended to an account holder entity 130, are most likely to result in an established account or other relationship with the account holder entity. In some embodiments, the machine-learned model is trained to identify patterns or correlations between characteristics of account holder entities 130 in the set of training information and characteristics of associated account provider entities 140 in the set of training information. In these embodiments, based on these identified patterns and correlations, the machine-learned model can identify, based on characteristics of a target entity, one or more account provider entities 140 associated with characteristics correlated to the characteristics of the target entity.

Figure 2:
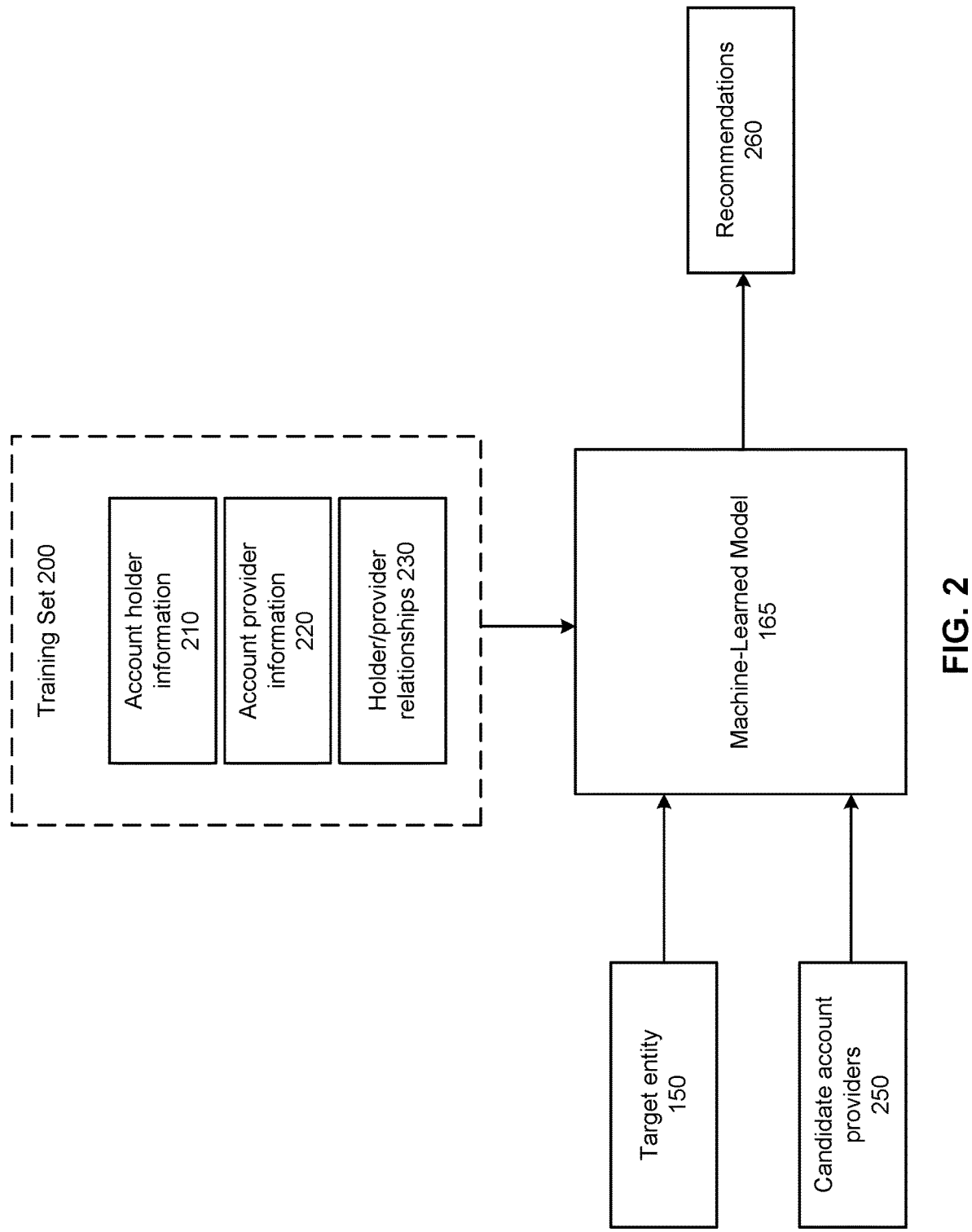
FIG. 2 is a data flow diagram illustrating the training and application of a machine-learned model, according to one embodiment.

FIG. 2 is a data flow diagram illustrating the training and application of a machine-learned model, according to one embodiment. In the embodiment of FIG. 2, the machine-learned model 165 is trained using a training set of information 200, including account holder information 210 (e.g., information representative of one or more account holder entities), account provider information 220 (e.g., information representative of one or more account provider entities), and account holder/provider relationship information 230 (e.g., information describing relationships between the account holders and the account providers). The machine-learned model 165 receives information associated with a target entity 150 and information associated with candidate account providers 250 (e.g., a target set of account provider entities), and identifies a set of recommendations 260 including a subset of the candidate account providers 250 that, when recommended to the target entity 150, are most likely to result in the establishment of an account with the target entity.

The recommendation engine 175 identifies a target entity 150 to which one or more account provider entities 140 are to be recommended. In some embodiments, the target entity 150 comprises an entity that does not have a relationship with a particular type of account provider entity. For instance, a company that does not have an account with an IT service provider can be selected, and one or more IT server providers can be recommended to the company. In some embodiments, the target entity 150 can be an entity that is requesting a recommendation to one or more account provider entities 140. In some embodiments, the recommendation engine 175 can identify the target entity 150 based on characteristics of the target entity (e.g., when the target entity grows to a certain headcount, the target entity can be selected so that a law firm can be recommended), based on a time or date (e.g., a target entity can be selected so that an accounting firm can be recommended within two months of tax day), based on relationships established by similar entities with account provider entities (e.g., if several companies in a particular industry within a particular geographic area are establishing relationships with manufacturers within the same industry, a company within the particular industry and particular geographic area can be selected as the target entity), or based on any other suitable criteria.

The recommendation engine 175 then identifies a set of characteristics associated with the target entity 150. Examples of the identified set of characteristics include a size of the target entity 150, an industry of the target entity, a filing state of the target entity, or any other suitable characteristics (such as any of the characteristics described above with regards to the account holder entities 130 or the account provider entities 140 and stored within the entity database 155).

The recommendation engine 175 identifies a target set of account provider entities, among which a subset will be selected for recommendation to the target entity 150. The target set of account provider entities are selected from among the account provider entities 140. In some embodiments, the target set of account provider entities comprise entities that have one or more characteristics in common with the target entity 150, and/or are selected based on characteristics of the target entity. For instance, the target set of account provider entities can be entities located in a same geographic region or state as the target entity 150, entities that operate in a same industry as the target entity, and the like. In some embodiments, the target set of account provider entities comprise all or a subset of the account provider entities 140 associated with a particular entity type. For instance, if the target entity is determined to not have a relationship or account with an email provider, the target set of account provider entities can be all email providers within the account provider entities 140. In some embodiments, the target set of account provider entities comprise entities within the account provider entities 140 that are seeking to accept new clients or customers. In other embodiments, the target set of account provider entities includes all of the account provider entities 140 (for instance, in embodiments where all of the account provider entities 140 are account provider entities of a particular type, such as enterprise software providers or accounting firms). In practice, any combination of the above factors or any other suitable factors may be used to select the target set of account provider entities.

The recommendation engine 175 identifies a set of characteristics associated with each of the target set of account provider entities. Example characteristics in the identified sets of characteristics include a size of the account provider entity, an industry of the account provider entity, a filing state of the account provider entity, or any other suitable characteristics (such as any of the characteristics described above with regards to the account holder entities 130 or the account provider entities 140 and stored within the entity database 155).

The recommendation engine 175 applies the machine-learned model 165 to the identified set of characteristics associated with the target entity 150 and the identified sets of characteristics associated with the target set of account provider entities, and the machine-learned model outputs a subset of the target set of account provider entities to recommend to the target entity. As described above, the subset of the target set of account provider entities are the account provider entities that, when recommended to the target entity 150, are most likely to result in an established account or other relationship or association with the account holder entity.

The subset of the target set of account provider entities output by the machine-learned model 165 may include the account provider entity most likely to result in an established account or relationship with the target entity when recommended to the target entity. The subset of the target set of account provider entities may also include all account provider entities within the target set of account provider entities that are associated with an above-threshold likelihood to, when recommended to the target entity, result in an established account or relationship with the target entity. The subset of the target set of account provider entities may also include a threshold number of the target set of account provider entities that are most likely to result in an established account or relationship with the target entity.

In some embodiments, the machine-learned model 165 is configured to recommend a first account provider entity that services account holder entities associated with an average headcount that is within a threshold headcount of a target entity over a second account provider entity that services account holder entities with an average headcount more than a threshold headcount away from the target entity. For instance, for a target entity with a headcount of 100 employees, the machine-learned model 165 can recommend a first account provider entity with clients that have an average headcount of 110 over a second account provider entity with clients that have an average headcount of 60 or 180.

In some embodiments, the machine-learned model 165 is configured to recommend a first account provider entity that services a threshold number or threshold percentage of account holder entities associated with a same filing state as the target entity over a second account provider entity that services less than a threshold number or threshold percentage of account holder entities associated with the same filing state. For instance, for a target entity with a filing state of California, the machine-learned model 165 can recommend a first account provider where 60% of the first account provider's clients file in California over a second account provider entity where 20% of the second account provider's clients file in California.

In some embodiments, the machine-learned model 165 is configured to recommend a first account provider entity that services a threshold number or threshold percentage of account holder entities associated with a same industry as the target entity over a second account provider entity that services less than a threshold number or threshold percentage of account holder entities associated with the same industry. For instance, for a target entity associated with robotics manufacturing, the machine-learned model 165 can recommend a first account provider where 90% of the first account provider's clients are in the robotics manufacturing industry over a second account provider entity where 40% of the second account provider's clients are in the robotics manufacturing industry.

In some embodiments, the machine-learned model 165 is configured to identify account provider entities based on any suitable factors. For instance, the machine-learned model 165 may be more likely to select account provider entities based on a capacity of the account provider entities (e.g., the number of account holder entities 130 associated with each account provider entity, the number of new account holder entities an account provider entity is willing to take on, etc.) Likewise, the machine-learned model 165 may be more likely to select account provider entities that specialize in an unusual, uncommon, or rare specialty (for instance, if only one, a few, or less than a threshold number of account provider entities associated with the central database system 110 are associated with the specialty).

In some embodiments, the machine-learned model 165 is configured to identify account provider entities based on a number of percentage of account holder entities that end relationships or accounts with each account provider entity, based on a maximum number of account holder entities that each account provider entity can service or have a relationship with, a number of counter or reciprocal referrals each account provider entity has made (e.g., a number of entities that each account provider entity has recommended the central database system 100 to), and the like.

It should be emphasized that the machine-learned model 165 can be configured to identify account provider entities based on any characteristic of the target entity 150, any characteristic of an account provider entity, any combination of the factors or characteristics described herein, or any other suitable characteristic.

The interface engine 180 coordinates communications between the entities of FIG. 1. For instance, the interface engine 180 receives information describing characteristics of the account holder entities 130, the account provider entities 140, and the target entity 150 (for instance, while onboarding and provisioning accounts within the central database system 110 for these entities), and stores the received information in the entity database 155. Likewise, the interface engine 180 can provide recommendations for the identified subset of account provider entities to the target entity 150. In some embodiments, the interface engine 180 generates and causes display of one or more graphic user interfaces (GUIs), for instance for display by a device of an account holder entity 130, a device of an account provider entity 140, and/or a device of the target entity 150.

Upon identifying a subset of the target set of account provider entities to recommend to the target entity 150, the interface engine 180 causes display of a notification within an interface displayed by a device associated with the target entity. In some embodiments, the interface displayed by the device associated with the target entity 150 includes a GUI displayed by an application executed by the device and associated with the central database system 110. In such embodiments, the notification can identify the subset of account provider entities along with text indicating that a relationship or account with one or more of the subset of account provider entities is recommended by the central database system 110. In some embodiments, the interface includes one or more interface elements (for instance, one interface element corresponding to each entity within the subset of account provider entities) that, when interacted with, causes a message or notification identifying the target entity to be sent to the account provider. In some embodiments, instead of a notification displayed within an interface of an application associated with the central database system 110, the recommended subset of account provider entities can be emailed, texted, or otherwise communicated to the target entity 150 for display within a different interface by a device of the target entity.

Figure 3:
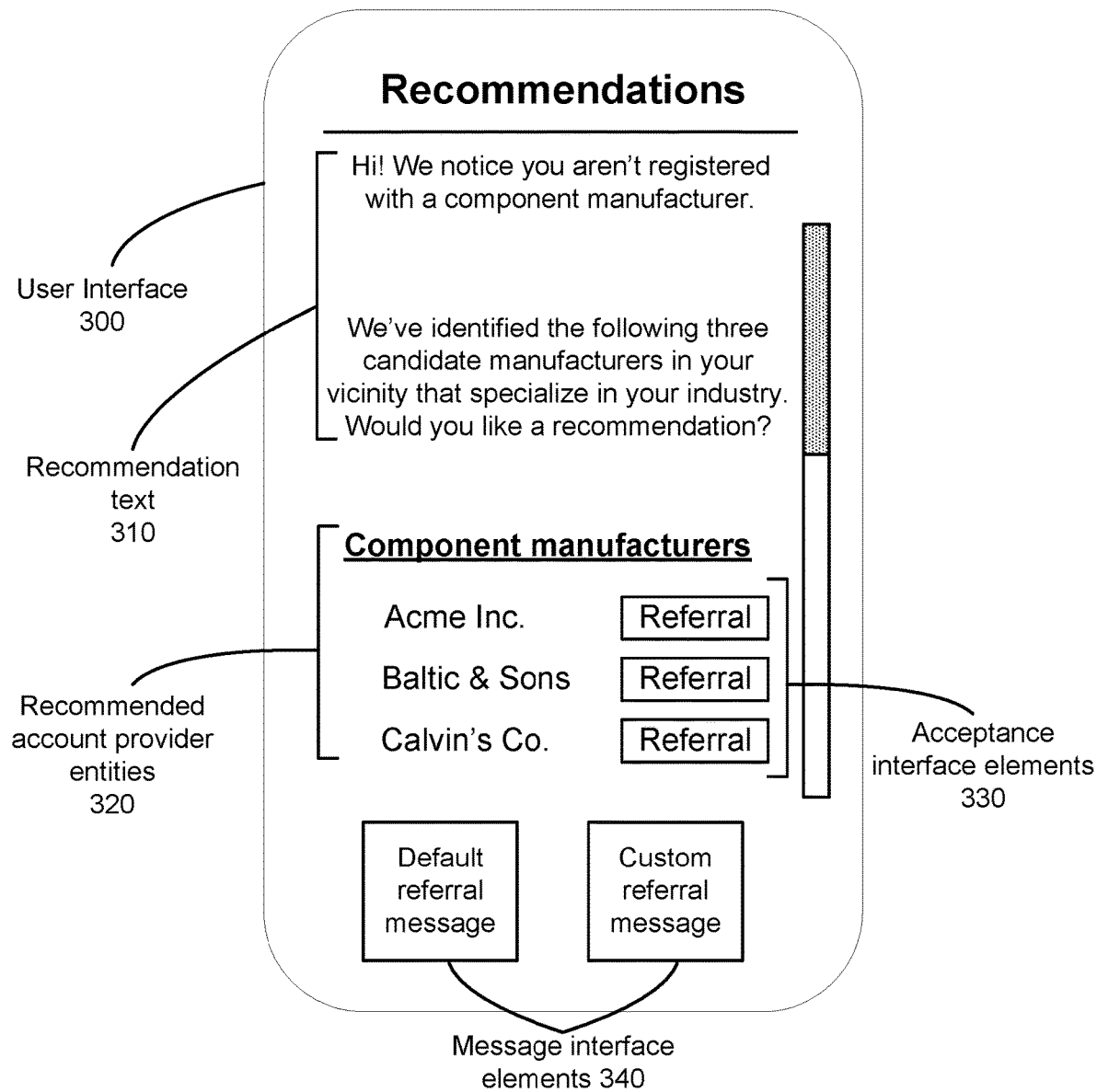
FIG. 3 illustrates an example interface associated with the central database system, according to one embodiment.

FIG. 3 illustrates an example interface associated with the central database system, according to one embodiment. The user interface 300 is displayed by a device of the target entity 150. At the top of the user interface 300 is recommendation text 310 that communicates to the target entity that 1) the central database system 100 recognized that the target entity is not associated with a component manufacture, 2) that the central database system identified candidate component manufacturers, and 3) asks the target entity if they would like a recommendation. The recommended account provider entities 320 are displayed within the user interface 300, in this case the component manufacturers "Acme Inc.", "Baltic & Sons", and "Calvin's Co." The user interface 300 further includes acceptance interface elements 330 that, when interacted with, cause a message or notification identifying the target entity 150 to be sent to the corresponding component manufacturer. The user interface 300 further includes message interface elements 340 that enable the target entity 150 to customize the message or notification sent to the component manufacturer (either a default referral message, or a target entity-created custom referral message).

When the target entity 150 accepts a recommendation (e.g., by selecting the interface element associated with a recommendation, when the target entity requests a referral, and the like), a message or notification identifying the target entity is sent for display by a device associated with the account provider entity associated with the accepted recommendation. The message or notification can include introductory text explaining that the target entity accepted a recommendation to the account provider entity associated with the accepted recommendation. For example, the message can say "Hello, the potential client XYZ has expressed interest in establishing an account with you. Would you like an introduction?"

In some embodiments, the account provider entity device displays the message or notification within an application interface corresponding to the central database system 110, while in other embodiments, the message is displayed as an email, a pop up window, a text message, or any other suitable form. The account provider entity associated with the accepted recommendation can, in response to accepting the referral (e.g., by selecting an interface element requesting to be introduced to the target entity 150, by sending a message to the target entity, and the like), initiate communication with the target entity. In some embodiments, the communication occurs via the central database system 100 (for instance, within an application corresponding to the central database system), while in other embodiments the communication occurs outside of the context of the central database system (in which case, either the target entity 150 or the account provider entity associated with the accepted recommendation can inform the central database system of the status of the recommendation). In some embodiments, in response to either the establishment or failure of an establishment of a relationship or account between the target entity 150 and the provider entity associated with the accepted recommendation, the central database system 100 can update the set of training information stored within the training information database 160, and the training engine 170 can retrain the machine-learned model 165 based on the updated set of training information.

FIG. 4 is a flowchart illustrating a process for training and applying a machine-learned model to recommend account provider entities to a target entity, according to one embodiment. It should be noted that in other embodiments, the process illustrated by FIG. 4 can include fewer, additional, or different steps than those described herein.

A training set of information is accessed 410 describing characteristics of account holder entities, account provider entities, and associated relationships between the account holder entities and account provider entities. In some embodiments, each account holder entity is associated with at least a first account provided by a central database system, and are associated with at least a second account provided by one or more of the account provider entities.

A machine-learned model is trained 420 using the accessed training set of information to identify account provider entities to recommend to prospective account holder entities. In particular, the machine-learned model can be trained to identify account provider entities that, if recommended to a particular entity, are most likely to result in an account being established between the particular entity and the account provider entities. As noted above, the machine-learned model can be a neural network, a Bayes classifier, a linear support vector machine, and the like.

The central database system identifies 430 a target entity associated with the central database system, and identifies 440 a target set of account provider entities based on characteristics of the identified target entity. For instance, the target entity can be an entity associated with an account of the central database system, but not associated with a particular type of account offered by the target set of account provider entities. Likewise, the identified target set of account provider entities can be account provider entities associated with a geographic region associated with the target entity, an industry associated with the target entity, and the like.

The central database system applies 450 the machine-learned model to characteristics of the target entity and characteristics of the target set of account provider entities to identify a subset of the account provider entities. The target entity is notified 460 of the identified subset of the account provider entities, for instance within a notification generated for display within a recommendation interface. The notification can include, for each of the subset of account provider entities, an interface element that, when selected, generates a notification identifying the target entity for display to the corresponding account provider entity.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A central database system comprising:
   a hardware processor; and
   a non-transitory computer-readable storage medium storing executable instructions that, when executed by the hardware processor, cause the hardware processor to perform steps comprising:
     accessing a training set of information describing a first set of account holder entities and a second set of account provider entities, each account holder entity associated with at least one account provider entity;
     training a machine-learned model using the accessed training set of information, the machine-learned model configured to identify one or more account provider entities that, if recommended to an account holder entity, are most likely to result in an established account with the account holder entity;
     identifying a target entity associated with one or more central database system accounts;
     identifying a target set of account provider entities based on the set of characteristics associated with the target entity;
     applying the trained machine-learned model to characteristics associated with the target entity and characteristics associated with the target set of account provider entities to identify a subset of the account provider entities to recommend to the target entity; and
     generating an interface displayed by a device associated with the target entity that includes the identified subset of account provider entities and that establishes a communication session between a selected account provider entity and the target entity.

2. The central database system of claim 1, wherein a first entity in the first set of account holder entities is associated with a second account provided by a second entity in the second set of account provided entities, the second account different from the one or more central database system accounts associated with the first entity, and the second entity different from the central database system.

3. The central database system of claim 1, wherein identifying the target entity comprises identifying an entity that does not have a relationship with a particular type of account provider entity.

4. The central database system of claim 3, wherein identifying the target set of account provider entities comprises identifying account provider entities associated with the particular type of account.

5. The central database system of claim 1, wherein the target set of account provider entities comprises all account provider entities determined by the machine-learned model to be associated with an above-threshold likelihood to, when recommended to the target entity, result in an established account with the target entity.

6. The central database system of claim 1, wherein the target set of account provider entities comprises a threshold number of account provider entities determined by the machine-learned model to be most likely to, when recommended to the target entity, result in an establish account with the target entity.

7. The central database system of claim 1, wherein the target set of account provider entities comprise a subset of all account providers associated with the central database system that are located within a same state or city as the target entity.

8. The central database system of claim 1, wherein the machine-learned model recommends account provider entities that service entities with an average headcount within a threshold headcount of the target entity over account provider entities that service entities with an average headcount more than a threshold headcount away from the target entity.

9. The central database system of claim 1, wherein the machine-learned model recommends account provider entities that service a threshold number of entities associated with a same filing state as the target entity over account provider entities that service less than the threshold number of entities associated with the same filing state.

10. The central database system of claim 1, wherein the machine-learned model recommends account provider entities that service a threshold number of entities associated with a same industry as the target entity over account provider entities that service less than the threshold number of entities associated with the same industry.

11. A method comprising:
- accessing a training set of information describing a first set of account holder entities and a second set of account provider entities, each account holder entity associated with at least one account provider entity;
- training a machine-learned model using the accessed training set of information, the machine-learned model configured to identify one or more account provider entities that, if recommended to an account holder entity, are most likely to result in an established account with the account holder entity;
- identifying a target entity associated with one or more central database system accounts;
- identifying a target set of account provider entities based on the set of characteristics associated with the target entity;
- applying the trained machine-learned model to characteristics associated with the target entity and characteristics associated with the target set of account provider entities to identify a subset of the account provider entities to recommend to the target entity; and
- generating an interface displayed by a device associated with the target entity that includes the identified subset of account provider entities and that establishes a communication session between a selected account provider entity and the target entity.

12. The method of claim 11, wherein a first entity in the first set of account holder entities is associated with a second account provided by a second entity in the second set of account provided entities, the second account different from the one or more central database system accounts associated with the first entity, and the second entity different from the central database system.

13. The method of claim 11, wherein identifying the target entity comprises identifying an entity that does not have a relationship with a particular type of account provider entity.

14. The method of claim 13, wherein identifying the target set of account provider entities comprises identifying account provider entities associated with the particular type of account.

15. The method of claim 11, wherein the target set of account provider entities comprises all account provider entities determined by the machine-learned model to be associated with an above-threshold likelihood to, when recommended to the target entity, result in an established account with the target entity.

16. The method of claim 11, wherein the target set of account provider entities comprises a threshold number of account provider entities determined by the machine-learned model to be most likely to, when recommended to the target entity, result in an establish account with the target entity.

17. The method of claim 11, wherein the target set of account providers comprise a subset of all account provider entities associated with the central database system that are located within a same state or city as the target entity.

18. The method of claim 11, wherein the machine-learned model recommends account provider entities that service entities with an average headcount within a threshold headcount of the target entity over account provider entities that service entities with an average headcount more than a threshold headcount away from the target entity.

19. The method of claim 11, wherein the machine-learned model recommends account provider entities that service a threshold number of entities associated with a same filing state as the target entity over account provider entities that service less than the threshold number of entities associated with the same filing state.

20. The method of claim 11, wherein the machine-learned model recommends account provider entities that service a threshold number of entities associated with a same industry as the target entity over account provider entities that service less than the threshold number of entities associated with the same industry.

* * * * *